(12) United States Patent
O'Rourke

(10) Patent No.: US 8,723,468 B2
(45) Date of Patent: May 13, 2014

(54) COOLED MOTOR

(75) Inventor: John O'Rourke, Irvine, CA (US)

(73) Assignee: Aurora Office Equipment Co., Ltd., Shanghai (CN)

( * ) Notice: Subject to any disclaimer, the term of this patent is extended or adjusted under 35 U.S.C. 154(b) by 631 days.

(21) Appl. No.: 13/096,843

(22) Filed: Apr. 28, 2011

(65) Prior Publication Data
US 2012/0274256 A1   Nov. 1, 2012

(51) Int. Cl.
G05B 5/00   (2006.01)
G05D 23/00   (2006.01)
H02H 7/08   (2006.01)

(52) U.S. Cl.
USPC .......... 318/473; 310/346; 310/12.29; 310/58; 310/62; 310/63

(58) Field of Classification Search
CPC ............... H02P 9/06; H02P 9/08; H02P 9/26
USPC .............. 318/473; 310/346, 12.29, 58, 62, 63
See application file for complete search history.

(56) References Cited

U.S. PATENT DOCUMENTS

| | | |
|---|---|---|
| 3,111,800 A | 11/1963 | Quianthy |
| 3,629,530 A | 12/1971 | Fischer |
| 3,724,766 A | 4/1973 | Bosland |
| 3,728,501 A | 4/1973 | Larson et al. |
| 3,746,815 A | 7/1973 | Drummer |
| 3,769,473 A | 10/1973 | Lay |
| 3,780,246 A | 12/1973 | Beckering et al. |
| 3,785,230 A | 1/1974 | Lokey |
| 3,829,850 A | 8/1974 | Guetersloh |
| 3,860,180 A | 1/1975 | Goldhammer |
| 3,873,796 A | 3/1975 | Worobec et al. |
| 3,947,734 A | 3/1976 | Fyler |
| 3,952,239 A | 4/1976 | Owing et al. |
| 3,953,696 A | 4/1976 | Reimann et al. |
| 3,971,906 A | 7/1976 | Sahrbacker |
| 4,002,874 A | 1/1977 | Brown |
| 4,016,490 A | 4/1977 | Weckenmann et al. |
| 4,018,392 A | 4/1977 | Wagner |
| 4,062,282 A | 12/1977 | Miller et al. |
| 4,068,805 A | 1/1978 | Oswald |
| 4,082,232 A | 4/1978 | Brewer |

(Continued)

FOREIGN PATENT DOCUMENTS

| | | |
|---|---|---|
| WO | WO2005/097331 A1 | 10/2005 |
| WO | WO2007/109753 | 9/2007 |
| WO | WO2008/042538 | 4/2008 |

*Primary Examiner* — Erick Glass
(74) *Attorney, Agent, or Firm* — WHGC, P.L.C.; John F. O'Rourke

(57) ABSTRACT

A motor having a first portion configured to turn in a forward direction, a second portion coaxially mirrors the first portion; and a central fan between the first and second portions, and forcing air through the portions. A thermoelectric cooler element, thermally coupled to the portion is configured to cool the motor. A motor controller is electrically coupled to the first and second portions, and operates a portion in response to a condition sensed by the motor controller. The condition sensed by the motor controller is a motor torque, a motor speed, a motor casing temperature, or a zoned motor casing temperature. A method includes detecting a motor operational command; selecting a motor operational state using motor portion responsive to the motor command; sensing a heating state of a motor portion; and providing a cooling state to the motor portion responsive to the heating state.

20 Claims, 2 Drawing Sheets

(56) References Cited

U.S. PATENT DOCUMENTS

| | | | |
|---|---|---|---|
| 4,107,484 A | 8/1978 | Petersen, III |
| 4,117,752 A | 10/1978 | Yoneda |
| 4,125,228 A | 11/1978 | Brewer |
| 4,135,068 A | 1/1979 | Burns |
| 4,162,042 A | 7/1979 | Mommsen et al. |
| 4,172,400 A | 10/1979 | Brierley |
| 4,180,716 A | 12/1979 | Suzuki |
| 4,187,420 A | 2/1980 | Piber |
| 4,194,698 A | 3/1980 | Kosmowski |
| 4,262,179 A | 4/1981 | Bauer |
| 4,276,459 A | 6/1981 | Willet et al. |
| 4,277,666 A | 7/1981 | Vignaud |
| 4,349,814 A | 9/1982 | Akehurst |
| 4,423,844 A | 1/1984 | Sours et al. |
| 4,449,062 A | 5/1984 | Wilson |
| 4,471,915 A | 9/1984 | Levin et al. |
| 4,510,860 A | 4/1985 | LaBarge et al. |
| 4,518,958 A | 5/1985 | Cook et al. |
| 4,549,097 A | 10/1985 | Ulmer |
| 4,562,971 A | 1/1986 | Schwelling |
| 4,564,146 A | 1/1986 | Bleasdale |
| 4,598,182 A | 7/1986 | Breslin |
| 4,664,317 A | 5/1987 | Morton |
| 4,673,136 A | 6/1987 | Bainco et al. |
| 4,683,381 A | 7/1987 | Dufoug |
| 4,693,428 A | 9/1987 | Raterman et al. |
| 4,706,895 A | 11/1987 | Bricker |
| 4,709,197 A | 11/1987 | Goldhammer et al. |
| 4,713,509 A | 12/1987 | Chebowski |
| 4,751,603 A | 6/1988 | Kwan |
| 4,753,323 A | 6/1988 | Kahkipuro |
| 4,767,895 A | 8/1988 | Parrish |
| 4,771,359 A | 9/1988 | Link |
| 4,784,601 A | 11/1988 | Nitta |
| 4,784,602 A | 11/1988 | Nitta |
| 4,798,116 A | 1/1989 | Silver et al. |
| 4,821,967 A | 4/1989 | Moriyama |
| 4,824,029 A | 4/1989 | Stottmann et al. |
| 4,839,533 A | 6/1989 | Aga |
| 4,859,172 A | 8/1989 | Nitta |
| 4,882,458 A | 11/1989 | Berg et al. |
| 4,893,027 A | 1/1990 | Kammerer et al. |
| 4,900,881 A | 2/1990 | Fisher |
| 4,910,365 A | 3/1990 | Kuo |
| 4,944,462 A | 7/1990 | Raterman et al. |
| 4,982,058 A | 1/1991 | Schroeder et al. |
| 5,037,033 A | 8/1991 | Stottmann et al. |
| 5,044,270 A | 9/1991 | Schwelling |
| 5,045,648 A | 9/1991 | Fogelman, Sr. |
| 5,065,947 A | 11/1991 | Farnsworth |
| 5,081,406 A | 1/1992 | Hughes et al. |
| 5,100,067 A | 3/1992 | Konig et al. |
| 5,135,178 A | 8/1992 | Strohmeyer |
| 5,166,679 A | 11/1992 | Vranish et al. |
| 5,167,374 A | 12/1992 | Strohmeyer |
| 5,171,143 A | 12/1992 | Sohn |
| 5,186,398 A | 2/1993 | Vigneaux, Jr. |
| 5,207,392 A | 5/1993 | Stangenberg et al. |
| 5,236,138 A | 8/1993 | Stangenberg et al. |
| 5,268,553 A | 12/1993 | Shimoji |
| 5,269,473 A | 12/1993 | Strohmeyer et al. |
| 5,275,342 A | 1/1994 | Galanty |
| 5,279,467 A | 1/1994 | Lydy |
| 5,295,633 A | 3/1994 | Kimbro et al. |
| 5,318,229 A | 6/1994 | Brown |
| D348,431 S | 7/1994 | Hofmann |
| 5,345,138 A | 9/1994 | Mukaidono et al. |
| 5,356,286 A | 10/1994 | Sher |
| 5,397,890 A | 3/1995 | Schueler et al. |
| 5,407,346 A | 4/1995 | Sher |
| 5,421,720 A | 6/1995 | Sher |
| 5,432,308 A | 7/1995 | Howie, Jr. |
| 5,436,613 A | 7/1995 | Ghosh |
| 5,460,516 A | 10/1995 | Sher |
| 5,494,229 A | 2/1996 | Rokos et al. |
| 5,568,895 A | 10/1996 | Webb et al. |
| 5,607,295 A | 3/1997 | Khemarangsan |
| 5,621,290 A | 4/1997 | Heller et al. |
| 5,636,801 A | 6/1997 | Kroger |
| 5,655,725 A | 8/1997 | Kroger |
| 5,662,280 A | 9/1997 | Nishio et al. |
| 5,667,152 A | 9/1997 | Mooring |
| 5,680,999 A | 10/1997 | Wada |
| 5,704,776 A | 1/1998 | Sher |
| 5,724,737 A | 3/1998 | Stones |
| 5,775,605 A | 7/1998 | Tsai |
| 5,788,476 A | 8/1998 | Sher |
| 5,829,697 A | 11/1998 | Kroger |
| 5,829,963 A | 11/1998 | Ichikawa |
| 5,850,342 A | 12/1998 | Nakamura et al. |
| 5,868,242 A | 2/1999 | Hall et al. |
| 5,884,855 A | 3/1999 | Chang |
| 5,897,065 A | 4/1999 | Schwelling |
| 5,921,367 A | 7/1999 | Kashioka et al. |
| D412,716 S | 8/1999 | Kroger |
| 5,942,975 A | 8/1999 | Sørensen |
| 5,988,542 A | 11/1999 | Henreckson et al. |
| 6,065,696 A | 5/2000 | Tsai |
| 6,079,645 A | 6/2000 | Henreckson et al. |
| 6,082,643 A | 7/2000 | Kovacs |
| 6,082,644 A | 7/2000 | Turner |
| 6,089,482 A | 7/2000 | Chang |
| 6,113,017 A | 9/2000 | Tsai |
| 6,116,528 A | 9/2000 | Schwelling |
| 6,247,828 B1 | 6/2001 | Herst |
| D444,809 S | 7/2001 | Chang |
| 6,260,780 B1 | 7/2001 | Kroger et al. |
| 6,265,682 B1 | 7/2001 | Lee |
| 6,274,828 B1 | 8/2001 | Chu |
| 6,308,904 B1 | 10/2001 | Chang |
| 6,325,309 B1 | 12/2001 | Chang |
| 6,340,124 B1 | 1/2002 | Charles et al. |
| 6,354,086 B1 * | 3/2002 | Inoue et al. ................. 62/3.2 |
| 6,376,939 B1 | 4/2002 | Suzuki et al. |
| 6,418,004 B1 | 7/2002 | Mather et al. |
| 6,501,198 B2 | 12/2002 | Taylor et al. |
| 6,536,536 B1 | 3/2003 | Gass et al. |
| 6,550,701 B1 | 4/2003 | Chang |
| 6,575,285 B2 | 6/2003 | Jong |
| D481,416 S | 10/2003 | Chang |
| 6,629,654 B2 | 10/2003 | Neely et al. |
| 6,655,943 B1 | 12/2003 | Peterson et al. |
| 6,676,050 B2 | 1/2004 | Chang |
| 6,676,460 B1 | 1/2004 | Motsenbocker |
| 6,724,324 B1 | 4/2004 | Lambert |
| D494,607 S | 8/2004 | Huang |
| 6,775,018 B1 | 8/2004 | Taniguchi |
| 6,779,747 B2 | 8/2004 | McLean et al. |
| 6,813,983 B2 | 11/2004 | Gass et al. |
| 6,822,698 B2 | 11/2004 | Clapper |
| 6,826,988 B2 | 12/2004 | Gass et al. |
| 6,834,730 B2 | 12/2004 | Gass et al. |
| 6,857,345 B2 | 2/2005 | Gass et al. |
| D502,713 S | 3/2005 | Huang |
| D502,714 S | 3/2005 | Huang |
| 6,877,410 B2 | 4/2005 | Gass et al. |
| 6,880,440 B2 | 4/2005 | Gass et al. |
| 6,920,814 B2 | 7/2005 | Gass et al. |
| 6,922,153 B2 | 7/2005 | Pierga et al. |
| 6,945,148 B2 | 9/2005 | Gass et al. |
| 6,945,149 B2 | 9/2005 | Gass et al. |
| 6,957,601 B2 | 10/2005 | Gass et al. |
| 6,962,301 B1 | 11/2005 | Chang |
| 6,966,513 B2 | 11/2005 | Chang |
| 6,976,648 B2 | 12/2005 | Chang |
| 6,978,954 B2 | 12/2005 | Kroeger |
| 6,979,813 B2 | 12/2005 | Avril |
| 6,981,667 B2 | 1/2006 | Huang |
| 6,983,903 B2 | 1/2006 | Chang |
| 6,994,004 B2 | 2/2006 | Gass et al. |
| 6,997,090 B2 | 2/2006 | Gass et al. |
| 7,000,514 B2 | 2/2006 | Gass et al. |
| 7,024,975 B2 | 4/2006 | Gass et al. |
| 7,040,559 B2 | 5/2006 | Matlin et al. |

(56) References Cited

U.S. PATENT DOCUMENTS

| | | | |
|---|---|---|---|
| 7,044,410 | B2 | 5/2006 | Huang |
| 7,048,218 | B2 | 5/2006 | Huang |
| 7,055,417 | B1 | 6/2006 | Gass |
| 7,077,039 | B2 | 7/2006 | Gass et al. |
| 7,083,129 | B2 | 8/2006 | Beam, III |
| 7,093,668 | B2 | 8/2006 | Gass et al. |
| 7,098,800 | B2 | 8/2006 | Gass |
| 7,100,483 | B2 | 9/2006 | Gass et al. |
| 7,121,358 | B2 | 10/2006 | Gass et al. |
| 7,137,326 | B2 | 11/2006 | Gass et al. |
| 7,150,422 | B2 | 12/2006 | Wang |
| 7,171,879 | B2 | 2/2007 | Gass et al. |
| 7,171,897 | B2 | 2/2007 | Barajas et al. |
| 7,195,185 | B2 | 3/2007 | Matlin |
| 7,197,969 | B2 | 4/2007 | Gass et al. |
| 7,210,383 | B2 | 5/2007 | Gass et al. |
| 7,225,712 | B2 | 6/2007 | Gass et al. |
| 7,228,772 | B2 | 6/2007 | Gass |
| 7,231,856 | B2 | 6/2007 | Gass et al. |
| 7,284,467 | B2 | 10/2007 | Gass et al. |
| 7,290,472 | B2 | 11/2007 | Gass et al. |
| 7,308,843 | B2 | 12/2007 | Gass et al. |
| 7,311,276 | B2 | 12/2007 | Matlin |
| 7,328,752 | B2 | 2/2008 | Gass et al. |
| 7,344,096 | B2 | 3/2008 | Matlin et al. |
| D583,859 | S | 12/2008 | Holderfield |
| D584,342 | S | 1/2009 | Parratt |
| D591,335 | S | 4/2009 | Holderfield et al. |
| 7,631,822 | B2 | 12/2009 | Matlin et al. |
| 7,631,823 | B2 | 12/2009 | Matlin et al. |
| 7,631,824 | B2 | 12/2009 | Matlin et al. |
| 7,635,102 | B2 | 12/2009 | Matlin et al. |
| 8,159,094 | B2 * | 4/2012 | Ruffing et al. .................. 310/61 |
| 8,495,879 | B2 * | 7/2013 | Grace ............................ 60/690 |
| 2001/0030114 | A1 | 10/2001 | Thielman |
| 2002/0002942 | A1 | 1/2002 | Abraham et al. |
| 2002/0017175 | A1 | 2/2002 | Gass et al. |
| 2002/0017176 | A1 | 2/2002 | Gass et al. |
| 2002/0017178 | A1 | 2/2002 | Gass et al. |
| 2002/0017179 | A1 | 2/2002 | Gass et al. |
| 2002/0017180 | A1 | 2/2002 | Gass et al. |
| 2002/0017181 | A1 | 2/2002 | Gass et al. |
| 2002/0017182 | A1 | 2/2002 | Gass et al. |
| 2002/0017183 | A1 | 2/2002 | Gass et al. |
| 2002/0017184 | A1 | 2/2002 | Gass et al. |
| 2002/0017336 | A1 | 2/2002 | Gass et al. |
| 2002/0020261 | A1 | 2/2002 | Gass et al. |
| 2002/0020262 | A1 | 2/2002 | Gass et al. |
| 2002/0020263 | A1 | 2/2002 | Gass et al. |
| 2002/0020265 | A1 | 2/2002 | Gass et al. |
| 2002/0056348 | A1 | 5/2002 | Gass et al. |
| 2002/0056349 | A1 | 5/2002 | Gass et al. |
| 2002/0056350 | A1 | 5/2002 | Gass et al. |
| 2002/0059853 | A1 | 5/2002 | Gass et al. |
| 2002/0059854 | A1 | 5/2002 | Gass et al. |
| 2002/0059855 | A1 | 5/2002 | Gass et al. |
| 2002/0066346 | A1 | 6/2002 | Gass et al. |
| 2002/0069734 | A1 | 6/2002 | Gass et al. |
| 2002/0111702 | A1 | 8/2002 | Angel |
| 2002/0139877 | A1 | 10/2002 | Beam |
| 2002/0170399 | A1 | 11/2002 | Gass et al. |
| 2002/0170400 | A1 | 11/2002 | Gass |
| 2002/0190581 | A1 | 12/2002 | Gass et al. |
| 2003/0002942 | A1 | 1/2003 | Gass et al. |
| 2003/0005588 | A1 | 1/2003 | Gass et al. |
| 2003/0015253 | A1 | 1/2003 | Gass et al. |
| 2003/0019341 | A1 | 1/2003 | Gass et al. |
| 2003/0037651 | A1 | 2/2003 | Gass et al. |
| 2003/0056853 | A1 | 3/2003 | Gass et al. |
| 2003/0058121 | A1 | 3/2003 | Gass et al. |
| 2003/0090224 | A1 | 5/2003 | Gass et al. |
| 2003/0090226 | A1 | 5/2003 | Chen et al. |
| 2003/0196824 | A1 | 10/2003 | Gass et al. |
| 2004/0008122 | A1 | 1/2004 | Michael |
| 2004/0040426 | A1 | 3/2004 | Gass et al. |
| 2004/0043696 | A1 | 3/2004 | Suzuki |
| 2004/0163514 | A1 | 8/2004 | Gass et al. |
| 2004/0173430 | A1 | 9/2004 | Gass |
| 2004/0181951 | A1 | 9/2004 | Wittke |
| 2004/0194594 | A1 | 10/2004 | Dils et al. |
| 2004/0226800 | A1 | 11/2004 | Pierga et al. |
| 2005/0039586 | A1 | 2/2005 | Gass et al. |
| 2005/0039822 | A1 | 2/2005 | Gass et al. |
| 2005/0041359 | A1 | 2/2005 | Gass |
| 2005/0132859 | A1 | 6/2005 | Hunag |
| 2005/0157203 | A1 | 7/2005 | Nakakuki et al. |
| 2005/0166736 | A1 | 8/2005 | Gass et al. |
| 2005/0218250 | A1 | 10/2005 | Matlin et al. |
| 2005/0274834 | A1 | 12/2005 | Huang |
| 2005/0274836 | A1 | 12/2005 | Chang |
| 2006/0048518 | A1 * | 3/2006 | Bell ............................... 62/3.2 |
| 2006/0091247 | A1 | 5/2006 | Matlin |
| 2006/0157600 | A1 | 7/2006 | Wang |
| 2006/0169619 | A1 | 8/2006 | Wang |
| 2006/0249609 | A1 | 11/2006 | Huang |
| 2009/0167120 | A1 * | 7/2009 | Kato et al. .................. 310/60 R |

* cited by examiner

COOLED MOTOR

BACKGROUND

1. Field of the Invention

The present invention relates to electric motors and more particularly to electric motors having cooling apparatus.

2. Background Art

Product satisfaction is driven at a particular product price point by product safety, product reliability, and product longevity. This is particularly so in the field of paper shredders, where a shredder can be expected to endure excessive or rough wear regardless of the heartiness of the shredder product specifications. Such excessive or rough wear can, over time, degrade the reliability and longevity of the shredder product, causing the user to become dissatisfied with the product. In some cases, repeated stresses on the moving parts of the shredder may cause part failure, leading to the expense of product repair or replacement, a further decrease in satisfaction, or even loss of goodwill for the respective purchaser in the paper shredder brand. Even marginally stressful moments of operation may, in the aggregate, take their toll on the operating machinery of the shredder.

One shredder part which can be vulnerable to mechanical and thermal stresses is the shredder electric motor, which can arise from, for example, frequent starting; overloading; jamming; prolonged, unloaded operation; and continuous, beyond-rating use. Unnecessary electrical usage also is undesirable. Over time, the cumulative stresses faced by a shredder motor may lead to premature failure, or to poor performance. A common thread with these stressors is the heating effects of motor current ($I^2R$ losses). Many sophisticated electronic controllers have been devised to reduce the effects of $I^2R$ losses upon motors. Complex mechanical cooling systems have been advanced for large motors, as well. However, in the sphere of fractional-horsepower electric motors, as used in light- to medium-duty paper shredders and industrial equipment, sophisticated electronic controllers and complex mechanical coolers can add prohibitive premiums to the motor cost, and to the cost to purchasers, reducing a manufacturer's market share. An inexpensive cooling apparatus for motors is needed.

SUMMARY

Embodiments herein provide motor apparatus and methods of operating the motor apparatus. The motor can include a first portion configured to turn in a forward direction; a second portion configured to turn in the forward direction with the first portion, wherein the second portion is coaxially mirrored to the first portion; and at least one central vane fan disposed between the first portion and the second portion, and configured to force air through a portion of one of the first portion or the second portion. Embodiments also can include a thermoelectric cooler element (Peltier device), thermally coupled to at least one of the first or second portions, and configured to cool a portion of the motor. Other motor embodiments can include a motor controller electrically coupled to the first portion and to the second portion, and configured to operate at least one of the portion in a predetermined direction in response to a condition sensed by the motor controller. In still other embodiments the motor apparatus can include a heat sensor set apart from the thermoelectric cooler element, in which the thermoelectric cooler element being responsive to the heat sensor.

In motor apparatus having central vanes, at least two central vane fans are disposed between the first portion and the second portion and wherein at least two central vane fans force air into each of the first portion and the second portion when the first and second portions turn in the forward direction.

In still other motor embodiments, the motor can include a motor controller electrically coupled to the first portion and to the second portion, and configured to operate at least one of the portion in a predetermined direction in response to a condition of the motor. It also can include a thermoelectric cooler element, thermally coupled to at least one of the first or second portions, and configured to cool a portion of the motor; and a heat sensor set apart from the thermoelectric cooler element, the thermoelectric cooler element being responsive to the heat sensor. Furthermore, the motor embodiment can have at least two central vane fans disposed between the first portion and the second portion and wherein the at least two central vane fans force air into each of the first portion and the second portion when the first and second portions turn in the forward direction. Respective embodiments of the motor apparatus include an alternating current (AC) electric motor, a direct current (DC) electric motor, a brushless electric motor, or a brushed electric motor.

In yet other motor apparatus, a motor embodiment can include a first portion configured to turn in a forward direction or a reverse direction; a second portion configured to turn in the direction with the first portion, wherein the second portion is coaxially mirrored to the first portion; and two central vane fans set apart and disposed to force air between the first portion and the second portion. The embodiment includes a motor controller electrically coupled to the first portion and to the second portion, and configured to operate at least one of the portions in a predetermined direction in response to a condition sensed by the motor controller.

The motor apparatus embodiment further can include a motor casing surrounding the first portion and the second portion; a heat spreader thermally coupled to the motor casing; and a thermoelectric cooler element thermally coupled to and removing heat from one of the heat spreader and the motor casing in response to a condition sensed by the motor controller. In some embodiments of this motor apparatus embodiment, the condition sensed by the motor controller can be one of motor casing temperature, motor torque, or motor speed. In other embodiments, condition sensed by the motor controller is a zoned motor casing temperature.

A method of operating a motor is provided, including detecting a motor operational command; selecting a motor operational state responsive to the motor operational command using one motor part or another motor part or both; sensing a heating state of a portion of the motor; and providing a cooling state to the portion of the motor in response to the heating state. The method also can include electing a motor operational state having a power need; and one of energizing or de-energizing one motor part or another motor part or both to meet the power need. A motor embodiment can have a plurality of thermal zones, each of the zones including a heat sensor set apart from a thermoelectric cooling element and the method including selecting at least one thermal zone; and regulating the thermal state of the thermal zone responsive to the heat sensor.

BRIEF DESCRIPTION OF THE DRAWINGS

Embodiments of the present invention disclosed herein are illustrated by way of example, and are not limited by the accompanying figures, in which like references indicate similar elements, and in which.

Figure 1:
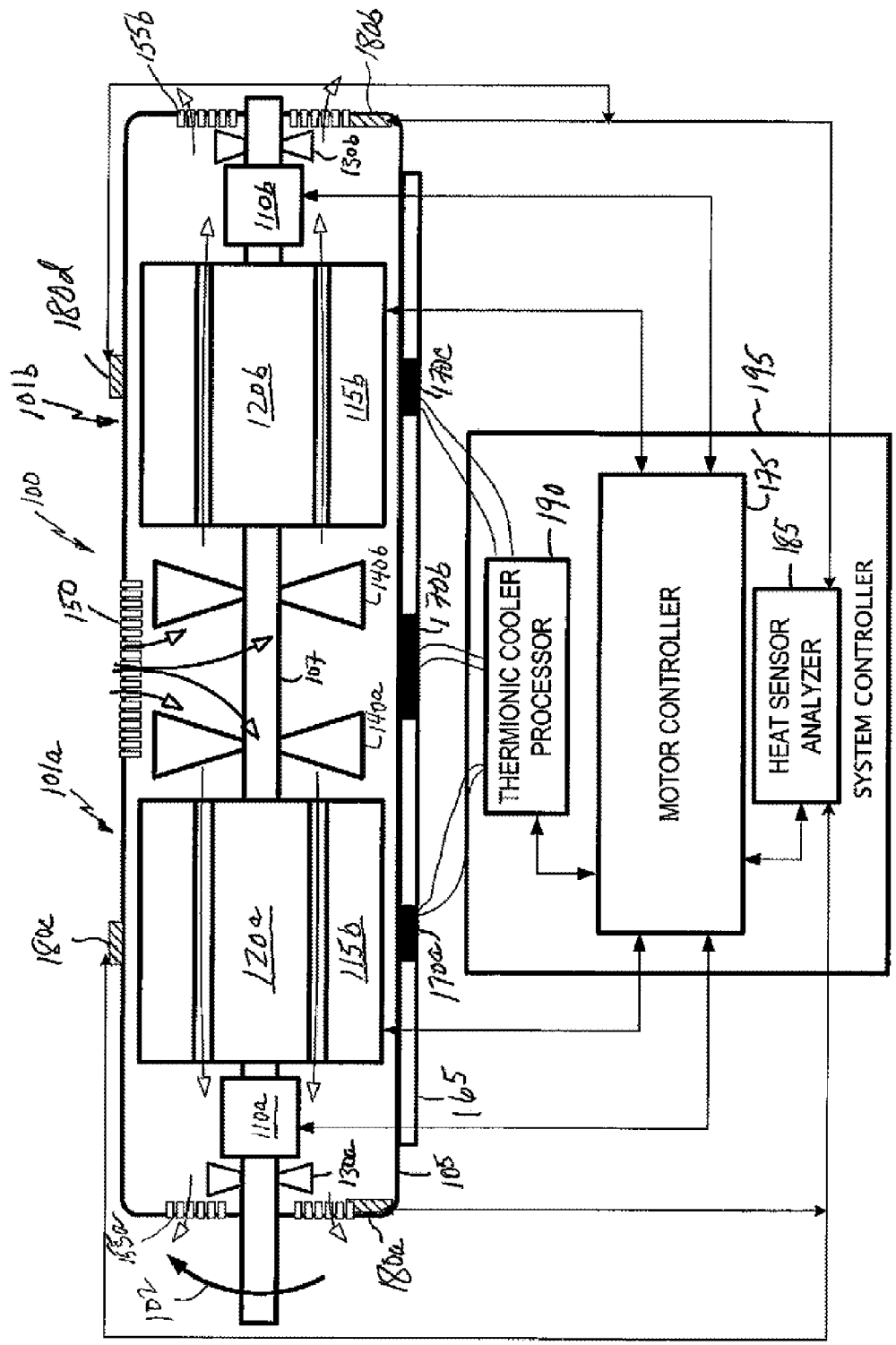
FIG. 1 is a graphical illustration of an embodiment of an electrical motor having a cooling system, in accordance with the teachings of the present invention.
Figure 2:
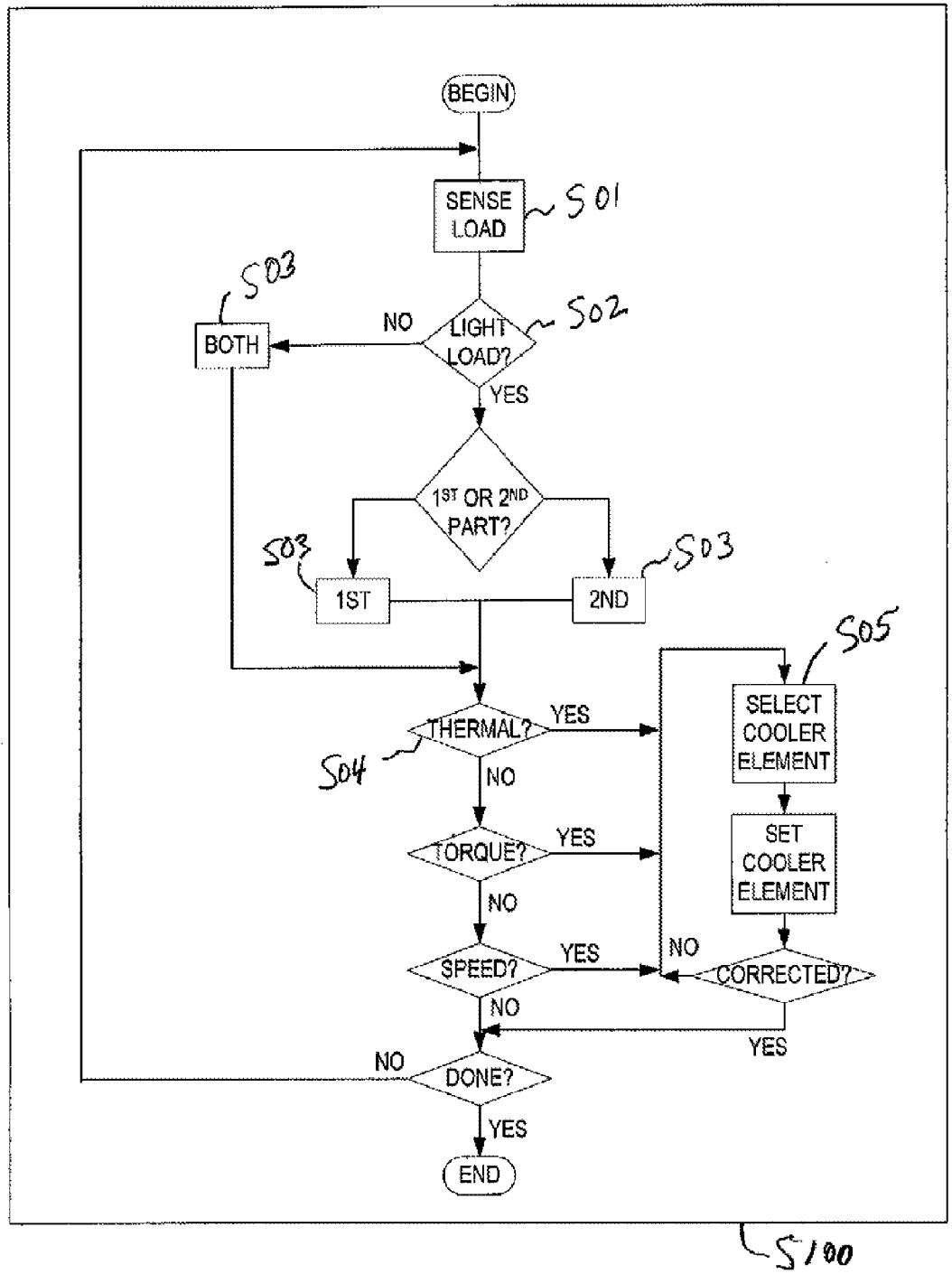
FIG. 2 is a flow diagram illustrating operational embodiments of an electrical motor, in accordance with the teachings of the present invention.

Skilled artisans can appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention. In the figures, like numbers correspond to like elements.

DETAILED DESCRIPTION

Embodiments of the present invention can assist in reducing overheating in a motor. In particular, selected embodiments can be used with a fractional horsepower (FHP) motor, as may be used without limitation, to power a light- or medium-duty office or industrial device. Some embodiments are passive devices, while some are active.

A universal motor in accordance with embodiments herein generally include a motor portion (101a) on the left side of a horizontal axis being mirrored by the motor portion (101b) on the right. The motor portions are enclosed in a ventilated casing 105, and employ a common rotor shaft 107. Accordingly, motor portions 101a, 101b respectively include a stator 115a, 115b, a rotor 120a, 120b, commutator 110a, 110b, commutator fan 130a, 130b, and rotor bearings 125a, 125b.

Although a universal series-wound type of motor is used to describe the innovations herein, embodiments may be used mutatis mutandi on an AC motor, a DC motor, a brushed motor, or a brushless motor. For purposes of the present presentation, "forward" motion is in the direction of rotation of the arrow 102. Motor 100 is configured such that both portions 101a and 101b rotate in the same direction and at the same speed at the same time. Motor 100 also may be configured to operate in a "reverse" direction, generally opposite of the "forward" direction of rotation. Suitable motor and system controllers may be developed from PIC® Microcontrollers, available from Microchip Technology Inc., Mission Viejo, Calif. USA.

In pre-existing motors, however, one commutator fan is employed, with the direction of air being forced over the commutator and to the small gap between the rotor and stator. With this configuration, motor temperature generally is uncontrolled throughout the motor and is uncompensated for temperature increases due to the motor slowing, increased motor torque, or inefficiencies arising from commutator fan being the sole cooling device. Current commutator fans also tend to push brush debris into the gap between the rotor and stator, leading to reduced performance and shortened life in the motor. In the embodiments of the present invention, commutator fans 130a, 130b are configured to drive air in the opposite direction, drawing air from the rotor/stator gap and across the commutator. Even so, cooling contributions from commutator fans are quite modest.

However, these and other shortcomings are overcome by adding two central fans 140a, 140b, to the stator shaft, and rotating the fan blade such that air received through external air intakes 150 is drawn in from air external to the casing 105. Intake air is blown through the gap between stator 115a, 115b and rotor 120a, 120b, and toward commutator 110a, 110b. Central fan blades 140a, 140b can be lobular, vane-axial, or other configuration capable of producing a steady flow of air of through the rotor/stator gap. For example, each of central fans may have 9 vanes and be configured to push air in opposite directions when the rotator shaft turns in the "forward" direction of rotation. Although the air from central fans 140a, 140b also tends to be reduced as the motor speed drops or as torque increases on the motor, the larger diameter of the central fan blades, relative to a common commutator fan, can help to supply a significant air flow when not stalled or torqued to a stop.

Likewise, commutator fan 130a, 130b is configured to move air away from the rotor, stator, and commutator, providing a boost to exhausted heated air through side vents 155a, 155b, overall increasing air flowing within motor 100.

Motor 100 does not rely solely on fans to provide cooling. Motor 100 also includes heat spreader 165 into which at least one thermoelectric cooler element, 170a, 170b, 170c, as cooled by the Peltier effect, is fitted thereon. A Peltier-effect thermoelectric cooler device (sometimes called a thermionic cooler) is well-known in the arts and may be obtained, for example, from TEC Microelectronics, Berlin Del. In some embodiments only one thermoelectric cooler element 170b may be used. In other embodiments only one thermoelectric cooler element 170b may be used without heat spreader 165. System controller 195 couples motor controller 175 to heat sensor analyzer 185 and thermoelectric cooler processor 190, and determines when and by how much thermoelectric coolers contribute to cooling of motor 100. Even so, coolers 170a-c may be responsive to control signals received from motor controller 175, which may cause thermoelectric cooler processor to selectively operate one or more of cooler elements 170a-c to provide cooling to the motor, for example, at time of slower rotational speed, increased torque, increased ambient temperature and other thermal increases.

Heat sensors 180a, 180b, 180c, 180d, may be placed judiciously at points on the motor casing 105, to detect differential heating by heat sensor analyzer 185, and to induce thermoelectric cooler processor 190 to attempt to regulate temperature to selected cooler temperatures in the vicinity of heat sensors 180a-d. Plural heat sensors 180a-180d may become associated with cooling zones of motor 100, as well as with plural cooler elements 170a-c. Motor controller 175 may cooperate with heat sensor analyzer 185 and thermoelectric cooler processor 190 in system controller 195 to provide zoned motor cooling, with a zone approximately identified by the thermal vicinity of each heat sensor 180a-d. Zoned cooling permits regional cooling or lack of cooling in a motor region which may be defined by a region surrounding a respective heat sensor 180a-d.

Although three (3) thermoelectric cooler elements and four (4) heat sensors are illustrated greater or fewer of one or both devices may be used as may be used to constrain motor temperature under one or more stressful conditions. Alternatively, a thermoelectric cooler may be operated to provide a selected amount of heating to a region of motor 100. Although, thermoelectric cooler elements 170a-c are depicted as being on the general bottomside of motor 100, it is within the scope of the present invention to encompass placement of cooler elements and heat sensors in other locations, and to have an at least partially conformal fitting of heat spreader 165 onto motor casing 105 onto which sensors and cooler elements are disposed.

In alternative embodiments, one or more thermoelectric cooler elements 170a-c may be eliminated, as may one or more of heat sensor 180a-d, motor controller 175, heat sensor analyzer 185, thermoelectric cooler processor 190 and system controller 195. In one embodiment, motor 100 may include the mechanical cooling elements including, without limitation, the central vane fans, as well as one thermoelectric cooler, biased to increase cooling as motor speed is reduced, as detected motor torque increases, or both. In yet another embodiments, external air intakes 150 can be configured and outfitted with replaceable air filters.

Furthermore, because both portions of the motor are configured to turn in the same direction, motor controller 175 may be configured to energize one portion (101a or 101b) of the motor 100 when the motor experiences a light or a suddenly decreased load, and to energize both portions 101a, 101b when the motor experiences a heavier load, or a sudden increase in load. Use as an auxiliary portion (101a or 101b) can be alternated to even wear. Selective operation of the first portion or of the second portion can allow one to use less energy, if less is sensed to be needed. Similarly, if motor controller 175 is operating in single rotor/stator mode and detects that motor 100 requires more power, motor controller can add power to the portion of the motor currently "idling." The section selected to be "idling" may be swapped between operating "turns" so that even usage can be achieved.

A method of operating a motor S100 with one part and another part may include, detecting a motor operational command (S01); selecting a motor operational state responsive to the command (S02); selecting operation the one part or the other part or both to meet the motor operational state (S03), sensing a heating state of the motor (S04), and providing a cooling state (S05) to a portion of the motor in response to the heating state.

A method may include detecting a motor operational command, which may include one of a forward direction motor operation or a reverse direction motor operation. Selecting a motor operational state responsive to the motor operational command may include selecting one motor part, another motor part, or both motor parts to be energized in response to the motor operational command. Sensing the heating state of the motor may include sensing the state of a heat sensor thermally coupled to the motor, analyzing the state of the heat sensor, applying a cooling current to a thermoelectric cooler element thermally coupled to the motor, providing thermal cooling to a region surrounding the thermoelectric cooler element. In some embodiments of the method, zone cooling can be employed in which the motor casing area can be set as thermal zones, having a heat sensor set apart from a corresponding cooling element, with the area of heat sensing and thermal cooling providing a thermal zone, which may overlap with another thermal zone, with the pragmatic object being to provide sufficient, inexpensive cooling to the motor.

When operating with one part of the motor operating, a motor controller can perform sensing of a power need state in which the other part of the motor is brought into operation to provide additional power. Conversely, when both parts of the motor are operating a motor controller can perform sensing of a power-need state in which one or the other part of the motor can be de-energized to reduce unnecessary power consumption.

The embodiments of the present invention disclosed herein are intended to be illustrative only, and are not intended to limit the scope of the invention. It should be understood by those skilled in the art that various modifications and adaptations of the prevent invention as well as alternative embodiments of the prevent invention may be contemplated or foreseeable. It is to be understood that the present invention is not limited to the sole embodiments described above, but encompasses any and all embodiments within the scope of the following claims.

What is claimed is:

1. A motor, comprising:
    a first portion configured to turn in a direction;
    a second portion configured to turn in the direction with the first portion, wherein the second portion coaxially mirrors the first portion; and
    at least one central fan disposed between the first portion and the second portion, and configured to force air through a portion of the first portion and the second portion.

2. The motor of claim 1, further comprising:
    a thermoelectric cooler element, thermally coupled to at least one of the first or second portions, and configured to cool the respective portion of the motor.

3. The motor of claim 1, further comprising:
    a motor controller electrically coupled to at least one of the first portion or the second portion, and configured to operate the at least one of the portion in a predetermined direction in response to a condition sensed by the motor controller.

4. The motor of claim 2, further comprising:
    a heat sensor set apart from the thermoelectric cooler element, the thermoelectric cooler element being responsive to the heat sensor.

5. The motor of claim 1, wherein at least two central fans are disposed between the first portion and the second portion and wherein at least two central fans force air into each of the first portion and the second portion when the first and second portions turn in the forward direction.

6. The motor of claim 1, further comprising:
    a motor controller electrically coupled to the first portion and to the second portion, and configured to operate at least one of the portion in a predetermined direction in response to a condition of the motor;
    a thermoelectric cooler element, thermally coupled to at least one of the first or second portions, and configured to cool a respective portion of the motor;
    a heat sensor set apart from the thermoelectric cooler element, the thermoelectric cooler element being responsive to the heat sensor; and
    at least two central vane fans disposed between the first portion and the second portion and wherein the a respective one of the two central vane fans force air into a corresponding portions when the first and second portions turn in the forward direction.

7. The motor of claim 6, further comprising an alternating current (AC) electric motor.

8. The motor of claim 6, further comprising a direct current (DC) electric motor.

9. The motor of claim 6, further comprising a brushless electric motor.

10. The motor of claim 6, further comprising a brushed electric motor.

11. A motor, comprising:
    a first portion configured to turn in a forward direction or a reverse direction;
    a second portion configured to turn in the direction with the first portion, wherein the second portion coaxially mirrors the first portion;
    two central vane fans set apart, wherein a respective fan is disposed to force air through a corresponding one of the first portion and the second portion;
    a motor controller electrically coupled to at least one of the first portion and the second portion, and configured to operate the at least one of the portions in a predetermined direction in response to a condition sensed by the motor controller.

12. The motor of claim 11, further comprising:
    a motor casing surrounding the first portion and the second portion;

a heat spreader thermally coupled to the motor casing, a thermoelectric cooler element thermally coupled to and removing heat from one of the heat spreader and the motor casing in response to a condition sensed by the motor controller.

13. The motor of claim 11, wherein the condition sensed by the motor controller is one of motor torque or motor speed.

14. The motor of claim 12, wherein the condition sensed by the motor controller is one of motor casing temperature, motor torque, or motor speed.

15. The motor of claim 12, wherein the condition sensed by the motor controller is a motor casing temperature zone.

16. A method of operating a motor, comprises:
detecting a motor operational command;
selecting a motor operational state responsive to the motor operational command using one motor part or another motor part or both;
sensing a heating state of a portion of the motor; and
providing a cooling state to the portion of the motor in response to the heating state.

17. The method of claim 16, further providing:
electing a motor operational state having a power need;
one of energizing or de-energizing one motor part or another motor part or both to meet the power need.

18. The method of claim 17, further comprising an AC motor.

19. The method of claim 17, further comprising a DC motor.

20. The method of claim 16, wherein the motor has a plurality of thermal zones, each of the zones including a heat sensor set apart from a thermoelectric cooling element, and further comprising: selecting at least one thermal zone; and regulating the thermal state of the thermal zone responsive to the heat sensor.

* * * * *